United States Patent
Sandler et al.

(10) Patent No.: US 8,756,533 B2
(45) Date of Patent: *Jun. 17, 2014

(54) MULTIPLE SEESAWING PANELS

(71) Applicant: Google Inc., Mountain View, CA (US)

(72) Inventors: Daniel Robert Sandler, Burlington, MA (US); Lee Brandon Keely, San Francisco, CA (US); Daniel Marc Gatan Shiplacoff, Los Altos, CA (US); Leon Hong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,541

(22) Filed: May 23, 2013

(65) Prior Publication Data

US 2014/0108995 A1 Apr. 17, 2014

Related U.S. Application Data

(63) Continuation of application No. 13/670,184, filed on Nov. 6, 2012, now Pat. No. 8,473,871.

(60) Provisional application No. 61/714,595, filed on Oct. 16, 2012.

(51) Int. Cl.
*G06F 3/048* (2013.01)

(52) U.S. Cl.
USPC ........... 715/863; 715/765; 715/781; 715/810; 715/702; 345/173

(58) Field of Classification Search
USPC ......... 715/702, 744, 764, 765, 781, 788, 800, 715/810, 815, 821, 835, 863; 345/169, 173
See application file for complete search history.

(56) References Cited

U.S. PATENT DOCUMENTS

| 7,549,127 | B2 | 6/2009 | Chasen et al. |
| 2006/0253791 | A1 | 11/2006 | Kuiken et al. |
| 2007/0234220 | A1 | 10/2007 | Khan et al. |
| 2011/0074809 | A1 | 3/2011 | Chen et al. |
| 2011/0105187 | A1 * | 5/2011 | Dobroth et al. ............... 455/566 |
| 2012/0066629 | A1 | 3/2012 | Lee et al. |

FOREIGN PATENT DOCUMENTS

| EP | 2328062 A2 | 10/2010 |
| WO | 2012110678 A1 | 8/2012 |

OTHER PUBLICATIONS

Search Report under Section 17 for Great Britain Application No. GB1317277.0, mailed Oct. 24, 2013, 4 pp.
Translation of Office Action from Korean Patent Application No. 10-2013-0122819, dated Dec. 18, 2013, 8 pp.

* cited by examiner

*Primary Examiner* — Xiomar L Bautista
(74) *Attorney, Agent, or Firm* — Shumaker & Sieffert, P.A.

(57) ABSTRACT

A computing device is described that receives an indication of a first gesture received at an input device. Responsive to receiving the indication of the first gesture, the computing device outputs, for display, a first information panel having a size. The computing device receives an indication of a second gesture received at the input device. The second gesture has a gesture length. Responsive to receiving the indication of the second gesture, the computing device outputs, for display, an updated graphical user interface that includes the first information panel and a second information panel. The second information panel has a panel length that corresponds to the gesture length of the second gesture.

20 Claims, 11 Drawing Sheets

MULTIPLE SEESAWING PANELS

This application is a Continuation of application Ser. No. 13/670,184, filed on Nov. 6, 2012, which claims the benefit of U.S. Provisional Application No. 61/714,595, filed Oct. 16, 2012, the entire content of each of which are hereby incorporated by reference.

BACKGROUND

Mobile computing devices (e.g., mobile phones and tablet computing devices) typically include a presence-sensitive screen for displaying information to and receiving input from a user. Many such mobile devices allow the user to provide touch inputs at the presence-sensitive screen using, e.g., a finger and/or stylus pen. These mobile computing devices may display, at the presence-sensitive screen, multiple information and control panels, but because the screen is typically small, these panels may share the same trigger region (e.g., the region of the screen for receiving input from the user to activate the panel displayed on the screen). As such, mobile computing devices may have difficulty disambiguating which information or control panel to activate based on a user input, thus preventing the user from easily and quickly accessing multiple information or control panels on the devices.

SUMMARY

In one example, the disclosure is directed to a method that may include receiving, by a computing device, an indication of a first gesture received at an input device. Responsive to receiving the indication of the first gesture, the method may include outputting, by the computing device, for display, a first information panel having a size. The method may further include receiving, by the computing device, an indication of a second gesture received at the input device, the second gesture having a gesture length. Responsive to receiving the indication of the second gesture, the method may include outputting, by the computing device, for display, an updated graphical user interface that includes the first information panel and a second information panel. The second information panel may have a panel length that corresponds to the gesture length of the second gesture.

In another example, the disclosure is directed to a computing device comprising one or more processors. The computing device may further comprise a gesture module operable by the one or more processors to receive an indication of a first gesture received at an input device, and receive an indication of a second gesture received at the input device. The second gesture may have a gesture length. The computing device may further comprise a user interface module operable by the one or more processors to, responsive to the gesture module receiving the indication of the first gesture, output, for display, a first information panel having a size. The user interface module may, responsive to the gesture module receiving the indication of the second gesture, output, for display, an updated graphical user interface that includes the first information panel and a second information panel. The second information panel may have a panel length that corresponds to the gesture length of the second gesture.

In another example, the disclosure is directed to a computer-readable storage medium comprising instructions that, when executed, configure one or more processors of a computing device to receive an indication of a first gesture detected at an input device. Responsive to receiving the indication of the first gesture, the instructions may further configure the one or more processors of the computing device to output, for display, a first information panel having a size. The instructions may further configure the one or more processors of the computing device to receive an indication of a second gesture received at the input device. The second gesture may have a gesture length. Responsive to receiving the indication of the second gesture, the instructions may further configure the one or more processors of the computing device to output, for display, an updated graphical user interface that includes the first information panel and a second information panel. The second information panel may have a panel length that corresponds to the gesture length of the second gesture.

The details of one or more examples are set forth in the accompanying drawings and the description below. Other features, objects, and advantages of the disclosure will be apparent from the description and drawings, and from the claims.

DETAILED DESCRIPTION

Techniques of this disclosure may enable a computing device to receive user input that quickly and easily triggers multiple information panels displayed at a screen (e.g., a presence-sensitive screen of the computing device). In some implementations, the computing device can, responsive to a user gesture received at the presence-sensitive screen, display a first information panel at the presence-sensitive screen, and, responsive to detection of a subsequent gesture, display a second information panel at the presence-sensitive screen. The computing device may display each information panel at the presence-sensitive screen based on an order of when the computing device received these gestures and/or locations where the computing device received these gestures. The computing device may present these information panels having a dynamically varying size and/or length based on these gesture inputs.

In this manner, the computing device can more clearly present information panels and can clearly indicate which information panel represents an active information panel. Techniques of this disclosure may enable the computing device to display information panels that a user can quickly and easily interact with. The computing device may receive fewer inputs from a user that cause the computing device to activate and/or display the wrong information panel. In turn, the computing device may receive fewer false inputs from the user, and as such, perform fewer operations and consume less electrical power.

Figure 1:
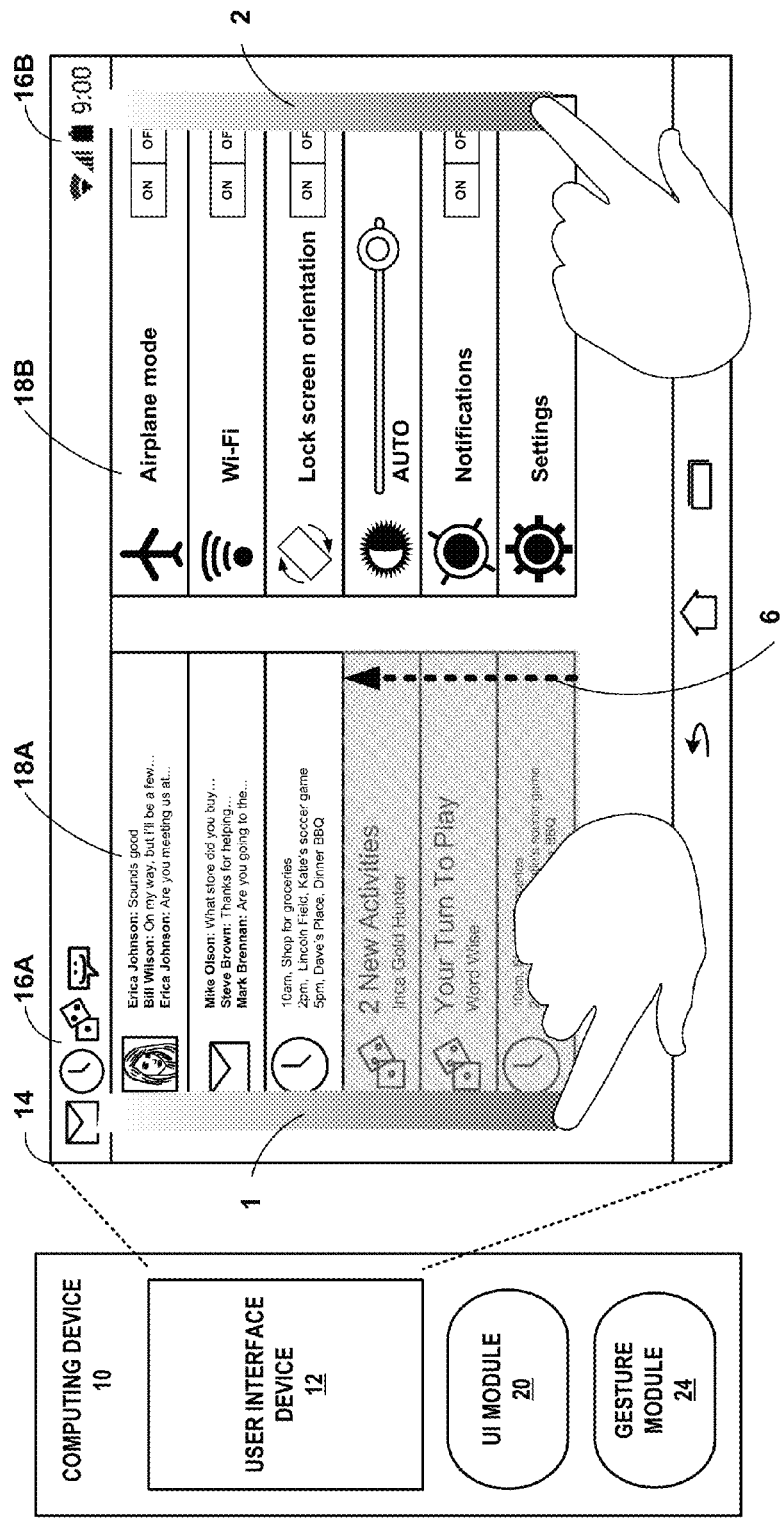
FIG. 1 is a conceptual diagram illustrating an example computing device that is configured to display multiple seesawing information panels, in accordance with one or more aspects of the present disclosure.

FIG. 1 is a conceptual diagram illustrating an example computing device that is configured to display multiple see-sawing information panels, in accordance with one or more aspects of the present disclosure. In the example of FIG. 1, computing device 10 is a tablet computer. However, in other examples, computing device 10 may be a mobile phone, a personal digital assistant (PDA), a laptop computer, a portable gaming device, a portable media player, an e-book reader, a watch, or another type of portable or mobile computing device.

Although discussed below with respect to a computing device that receives input at a presence-sensitive screen and outputs for display to a presence-sensitive screen, the use of a presence-sensitive screen for either input or output should not be construed to be in any way limiting. For instance, in some examples, rather than receive a user input from a presence-sensitive screen, the user input is received from a track pad or depth camera. In some examples, rather than output for display to a presence-sensitive screen, the computing device 10 outputs for display to a projector, a monitor, or other display device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive the tactile user input by detecting one or more taps and/or gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various functions and applications executing on computing device 10 such as an electronic message application, a map application, etc. UID 12 may present one or more information and control panels, such as a notification panel that includes notification information for a user and a settings panel that includes system settings information of computing device 10.

Computing device 10 may include user interface ("UI") module 20 and gesture module 24. Modules 20 and 24 may perform operations described herein using software, hardware, or a mixture of both hardware and software residing in and executing on computing device 10. Computing device 10 may execute modules 20 and 24 with multiple processors. Computing device 10 may execute modules 20 and 24 as a virtual machine executing on underlying hardware.

UI module 20 may cause UID 12 to present user interface 14. User interface 14 includes graphical elements displayed at various locations of UID 12. FIG. 1 illustrates elements 16A, elements 16B, information panel 18A, and information panel 18B, as example graphical elements included as part of user interface 14.

Elements 16A include notification icons (e.g., a new message icon, a calendar reminder icon, an activity icon, an instant message icon, etc.) that may alert a user of a notification received by computing device 10. For example, computing device 10 may execute an electronic mail (e-mail) application. The e-mail application may receive a new message and, in response to the new message, the e-mail application may send a new message notification to UI module 20. To inform a user of computing device 10 about the new message notification from the e-mail application, UI module 20 may include a new message icon within elements 16A of user interface 14 (shown in FIG. 1 as an envelope). Each of elements 16A may correspond to various notifications that UI module 20 may receive from applications executing on computing device 10. Each notification icon may alert a user to new or pending information related to each application, without displaying the new or pending information within user interface 14.

Information panel 18A is a notification panel that includes content related to one or more notifications. For example, information panel 18A may include the new or pending information that corresponds to elements 16A. UI module 20 may include the new or pending information as content within information panel 18A. A user of computing device 10 may view the content of notifications in information panel 18A. Information panel 18A may have a corresponding size, length, and width. The length of information panel 18A may indicate a distance between a top edge and a bottom edge of information panel 18A when presented on the presence-sensitive screen of UID 12. Similarly, the width of information panel 18A may indicate a distance between a left side edge and a right side edge of information panel 18A when presented on the presence-sensitive screen of UID 12. The size of information panel 18A may indicate an area consumed by information panel 18A when presented on the presence-sensitive screen of UID 12.

Elements 16B include system status icons. Each of the system status icons may alert a user to status information about computing device 10. For example, FIG. 1 illustrates system status icons related to Wi-Fi radio reception, cellular data reception, battery power, and system time.

Information panel 18B is one example of a settings panel that includes content related to one or more options for adjusting configuring system settings. From the settings panel, a user of computing device 10 may quickly and easily cause computing device 10 to change system settings of computing device 10, such as turning on or off a Wi-Fi radio coupled to computing device 10, activating airplane mode, and adjusting a brightness of the presence-sensitive screen of UID 12. Other options within information panel 18B may include an option to cause a detailed settings menu to appear in user interface 14, from which a user can select additional options for causing computing device 10 to adjust system settings. Similar to information panel 18A, information panel 18B may have a corresponding size, length, and width.

Gesture module 24 of computing device 10 may receive one or more indications of user input received at an input device of computing device 10 (e.g., the presence-sensitive screen of UID 12). Gesture module 24 may determine the user input corresponds to an indication of one or more user gestures. Gesture module 24 may determine that the user input corresponds to a gesture performed at the presence-sensitive screen of UID 12 when a user swipes a finger or a stylus pen from one location at the presence-sensitive screen of UID 12 to a second location.

For example, UID 12 may virtually overlay a grid of coordinates onto the presence-sensitive screen. The grid may assign a coordinate that includes a horizontal component (X) and a vertical component (Y) to each location. Each time UID 12 detects user input at the presence-sensitive screen, gesture module 24 may receive information from UID 12. The information may include one or more coordinate locations and associated times indicating to gesture module 24 both, where UID 12 detects user input on the presence-sensitive screen, and when UID 12 detects user input.

Gesture module 24 may assemble the information received from UID 12 into a time-ordered sequence of motion events. Each motion event in the sequence may include a location component as the coordinate location of the user input, a time component as the time associated with the user input, and an action component. The action component may indicate whether the motion event corresponds to a push down at the presence-sensitive screen or a lift up at the presence-sensitive screen.

Gesture module 24 may determine the action component of the first motion event in the sequence corresponds to a push down event. Gesture module 24 may determine the action component of a current motion event in the sequence (different from and subsequent to the first motion event) based on a previous motion event in the sequence. Gesture module 24 may compare the time and location components of the current motion event with the time and location components of a previous motion event. Gesture module 24 may determine that a large difference in time and/or distance (e.g., 10 milliseconds and/or 10 pixels) between two motion events indicates a lift up event, followed by a push down event. Gesture module 24 may identify a start location of a gesture as the location component of a first motion event in the sequence with a push down action component. Gesture module 24 may identify an end location of a gesture as the location component of a first motion event in the sequence with a lift up action component. Gesture module 24 may identify a start location of a second subsequent gesture as the location component of a first motion event in the sequence with a push down action component that follows a motion event in the sequence with a lift up action component.

Gesture module 24 may determine a length of a gesture (e.g., a gesture length) as a distance on the presence-sensitive screen between the start location of the gesture and the location component of the last motion event in the sequence that occurs prior to the motion event in the sequence that includes the end location of the gesture. Gesture module 24 may determine a length of a gesture before detecting an end of the gesture. For example, the length of a gesture may increase as the location components of motion events in the sequence move away from the start of the gesture. And prior to the end of the gesture, the length of the gesture may decrease as the location components of the motion events in the sequence move toward the start location of the gesture.

Prior to computing device 10 receiving an indication of a gesture, UI module 20 may cause UID 12 to present user interface 14 without information panels 18A and 18B. Based on an indication of gesture 1 received at the presence-sensitive screen of UID 12, UI module 20 may cause UID 12 to output for display (e.g., at the presence-sensitive screen of UID 12) user interface 14 which includes information panel 18A.

For example, gesture module 24 may receive information from UID 12 and determine the information indicates UID 12 received gesture 1 at the presence-sensitive screen (illustrated in FIG. 1 as an index finger of a right human hand sliding from elements 16A in a downward motion). Gesture module 24 may determine a start location of gesture 1 and a current length of gesture 1. UI module 20 may receive the start location and the current length of gesture 1 from gesture module 24 and in response, UI module 20 may modify user interface 14. The modification to user interface 14 may include updating user interface 14 to include information panel 18A.

UI module 20 may update the size of information panel 18A based on the current length of gesture 1 so that the size of information panel 18A may correspond to the length of gesture 1. For example, UI module 20 may include information panel 18A in user interface 14 with a size approximately proportionate to the length of gesture 1. Before gesture module 24 detects an end of gesture 1, the current length of gesture 1 may increase and/or decrease. UI module 20 may dynamically update the size of information panel 18A (by increasing and/or decreasing the size) based on changes detected by gesture module 24 in the current length of gesture 1.

After UI module 20 causes UID 12 to present information panel 18A, gesture module 24 may receive a subsequent indication of a gesture received at the presence-sensitive screen of UID 12. Gesture module 24 may process the subsequent indication as gesture 2 (illustrated in FIG. 1 as an index finger of a left human hand sliding from elements 16B in a downward motion). Gesture module 24 may determine a start location of gesture 2 and a current length of gesture 2 (e.g., a gesture length of gesture 2). UI module 20 may receive the start location and the current length of gesture 2 from gesture module 24.

Responsive to receiving the subsequent indication of the gesture received at the presence-sensitive screen of UID 12, UI module 20 may update user interface 14 based on the current length of gesture 2. In one example, UI module 20 may increase the length (e.g., the panel length) of information panel 18B approximately proportionate to the current length of gesture 2. In another example, in addition to increasing the length of information panel 18B approximately proportionate to the current length of gesture 2, UI module 20 may reduce the size of information panel 18A approximately proportionate to the current length of gesture 2. In another example, UI module 20 may modify user interface 14 to remove information panel 18A in response to gesture 2.

For instance, FIG. 1 includes decreasing arrow 6 to illustrate the size of information panel 18A decreasing as the current length of gesture 2 increases. UI module 20 may cause UID 12 to output for display on the presence-sensitive screen, information panel 18B, with the length of information panel 18B dynamically updating based on the current length of gesture 2. In addition, UI module 20 may cause UID 12 to output for display on the presence-sensitive screen, information panel 18A with the size of information panel 18A dynamically updating based on the current length of gesture 2 (e.g., by reducing the length of information panel 18A as the current length of gesture 2 increases, etc.). UI module 20 may likewise cause UID 12 to refrain from outputting (e.g., to remove) information panel 18A for display on the presence-sensitive screen.

In this way, computing device 10 may output information panels for display at the presence-sensitive screen of UID 12 as seesawing information panels. That is, computing device 10 may output for display, an initial information panel and a subsequent information panel that dynamically increase in length and/or reduce in size based on changes detected in the length of a gesture.

Figure 2:
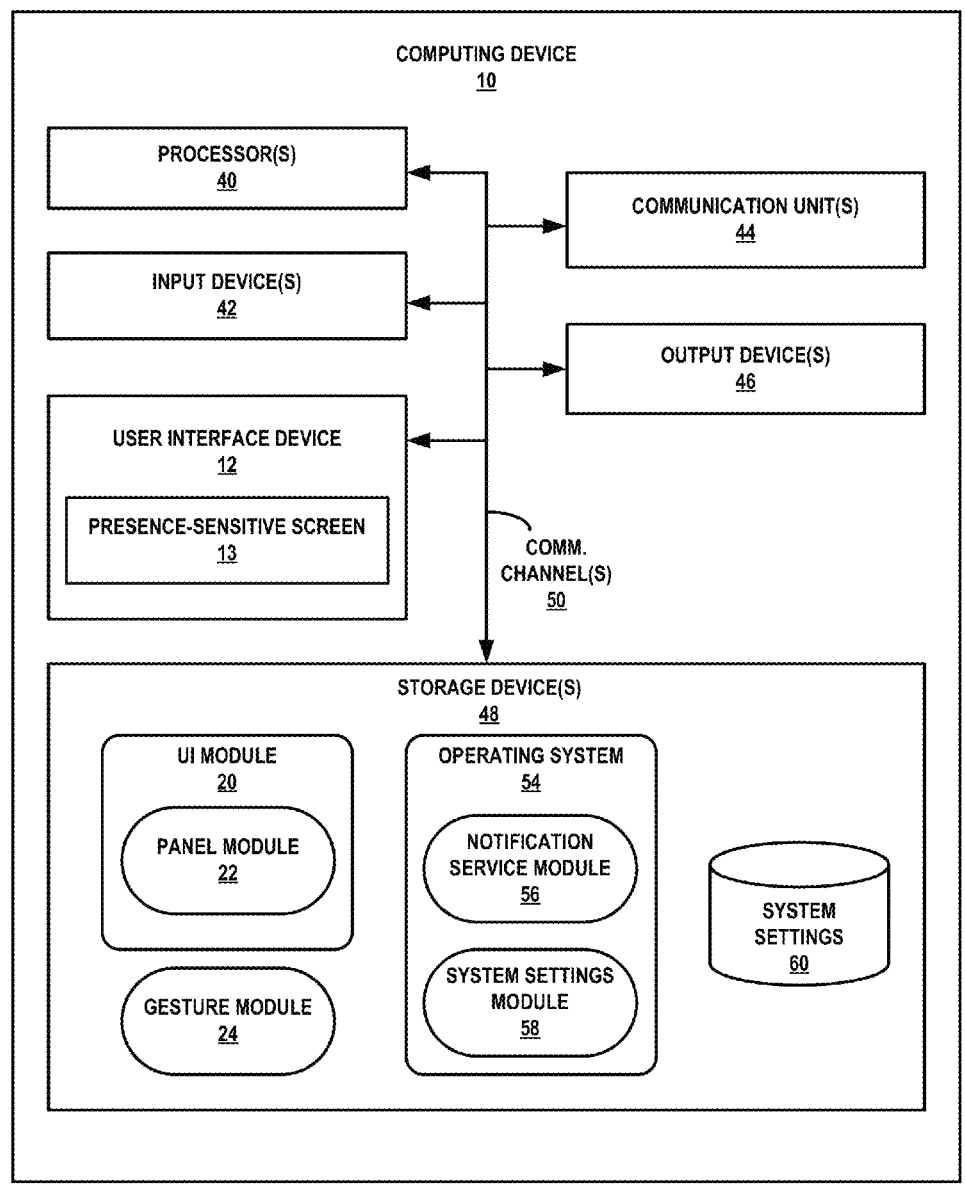
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. In this example, UID 12 also includes presence-sensitive screen 13. Storage devices 48 of computing device 10 also include UI module 20, gesture module 24, operating system 54 and system settings data store 60. UI module further includes panel module 22 while operating system 54 includes notification service module 56 and systems settings module 58. Communication channels 50 may interconnect each of the components 12, 13, 20, 22, 24, 40, 42, 44, 46, 48, 54, 56, 58, and 60 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, track pad, voice responsive system, video camera, depth camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g., an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

FIG. 2 illustrates UID 12 including presence-sensitive screen 13 (hereafter "screen 13"). Computing device 10 may use UID 12 as an input device and an output device. For example, screen 13 of UID 12 may include a touchscreen configured to receive tactile user input from a user of computing device 10. Screen 13 of UID 12 may also include an LED display capable of outputting visible information to the user of computing device 10. UID 12 may present a user interface at screen 13, such as user interface 14 of FIG. 1, and other various functions and applications executing on computing device 10.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a tablet computer). In another example, UID 12 represents an external component of computing device 10 located outside and physically separated from the packaging of computing device 10 (e.g., a track pad used for input and a monitor and/or a projector used for output that share a wired and/or wireless data path with a computer).

One or more storage devices 48 within computing device 10 may store information required for use during operation of computing device 10. For example, operating system 54 of computing device 10 may store information corresponding to one or more system settings of computing device 10 within system settings data store 60. Storage devices 48, in some examples, have the primary purpose of being short term and not long-term computer-readable storage mediums. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, panel module 22, gesture module 24, operating system 54, notifications service module 56, system settings module 58, and system settings data store 60.

One or more processors 40 may implement functionality and/or execute instructions within computing device 10. For example, processors 40 on computing device 10 may read and execute instructions stored by storage devices 48 that execute the functionality of UI module 20, gesture module 24, and operating system 54. These instructions executed by processors 40 may cause computing device 10 to store information, within storage devices 48 during program execution, such as system settings data store 60. Processors 40 may execute instructions of modules 20, 22, 24, 56, and 58 and operating system 54 to cause UID 12 to present seesawing information panels at screen 13. That is, modules 20, 22, 24, 56, and 58, and operating system 54 may be operable by processors 40 to perform various actions, including detecting gestures from a user and causing UID 12 to present a user interface at screen 13, such as user interface 14 of FIG. 1.

Operating system 54 of computing device 10 may manage computer hardware resources and provide common services for computer programs or applications executing on computing device 10. Operating system 54 may control the operation of components within computing device 10. For example, operating system 54 may manage the interaction between applications executing on computing device 10 and processors 40, UID 12, communication units 44, storage devices 48, input devices 42, and output devices 46.

Notification service module 56 of operating system 54 may receive notifications from various applications executing on computing device 10 and send the notifications to UI module 20 for presentation of information related to the notifications at screen 13. System settings module 58 of operating system 54 may manage system state and general performance of computing device 10. System settings module 58 may store state or control information for system settings within system settings data store 60. System settings module 58 may send and receive system settings data from UI module 20. For example a user may select an option within a user interface (e.g., user interface 14 of FIG. 1) to reduce a screen brightness. UI module 20 may send an indication of the selection to system settings module 58. System settings module 58 may cause the brightness of screen 13 to dim and may store the brightness setting as a system setting within system settings data store 60. System settings data store 60 may store system settings information of computing device 10 in the form of one or more of a multidimensional array, a linked list, a hash table, or any other data structure type used for organizing, preserving, and retrieving computing information.

In accordance with aspects of this disclosure, computing device 10 of FIG. 2 may output information panels for display as seesawing information panels. That is, computing device 10 may present information panels, such as information panels 18A and 18B of FIG. 1, at screen 13 by varying the size and/or length of each information panel based on characteristics of gesture inputs received from a user.

For instance, UI module 20 of computing device 10 may cause UID 12 to present user interface 14 of FIG. 1 at screen 13, including elements 16A and elements 16B but not yet including information panels 18A or 18B. UID 12 may receive an indication of a user input (e.g., gesture 1 of FIG. 1) received at screen 13. UID 12 may send information corresponding to the user input over communication channels 50 to operating system 54. Operating system 54 may process the information from UID 12 and send the information over communication channels 50 to gesture module 24. Gesture module 24 assemble the information and determine UID 12 received an indication of gesture 1 received at screen 13. From the information, gesture module 24 may determine a start location of gesture 1 and a current length of gesture 1. The start location of gesture 1 may correspond to a location at screen 13 that presents elements 16A.

In response to gesture module 24 processing the information related to the user input, operating system 54 may send data, including the start location and the current length of gesture 1, to UI module 20. UI module 20 may receive the data from operating system 54 over communication channels 50. From the data, UI module 20 may determine, based on the start location of gesture 1 and the length of gesture 1, that gesture 1 represents a command from the user to present an information panel (e.g., information panel 18A) that includes notification information within user interface 14.

Panel module 22 may send a request to notification service module 56, using communication channels 50, for notification information to include as content within information panel 18A. In response to the request, panel module 22 may receive and format notification information from notification service module 56. UI module 20 may update user interface 14 to include the notification information as content within information panel 18A. UI module 20 may base the size of information panel 18A on the current length of gesture 1 (e.g., the size of information panel 18A may correspond approximately proportionate to the current length of gesture 1). Using communication channels 50, UI module 20 may transmit a display command to UID 12 through operating system 54. The display command may cause UID 12 to output the updated user interface 14 that includes information panel 18A for display at screen 13.

UID 12 may receive a subsequent indication of a user input (e.g., gesture 2 of FIG. 1) received at screen 13. Gesture module 24 assemble information received from UID 12 and operating system 54 about the subsequent user input and determine UID 12 received an indication of gesture 2 received at screen 13. From the information about the subsequent user input, gesture module 24 may determine a start location of gesture 2 and a current length of gesture 2. The start location of gesture 2 may correspond to a location at screen 13 that displays elements 16B.

Operating system 54 may send data including the start location and the current length of gesture 2 from gesture module 24 to UI module 20. Based on the start location of gesture 2 and the length of gesture 2, UI module 20 may determine that gesture 2 represents a command from the user to present a second information panel (e.g., information panel 18B) that includes system settings information within user interface 14.

Panel module 22 may send a request to system settings module 58, using communication channels 50, for system settings information to include as content within information panel 18B. In response to the request, system settings module 58 may retrieve systems settings information (e.g., a screen brightness value, an on/off status of a Wi-Fi radio, etc.) from system settings data store 60. Panel module 22 may receive and format the systems settings information from systems settings module 58. UI module 20 may update user interface 14 to include the systems settings information as content within information panel 18B.

Receiving the indication of gesture 2 received at screen 13 may cause UI module 20 to adjust the length (e.g., the panel length) of information panel 18B approximately proportionate to the current length of gesture 2. UI module 20 may transmit a display command to UID 12 that causes UID 12 to output for display, at screen 13, the updated user interface 14 that includes information panels 18A and 18B.

In addition, receiving the indication of gesture 2 received at screen 13 may cause UI module 20 to update user interface 14 to include information panels 18A and 18B as seesawing information panels. UI module 20 may adjust the length of information panel 18B as described above, and in addition, UI module 20 may reduce the size of information panel 18A approximately proportionate to the current length of gesture 2. UI module 20 may transmit a display command to UID 12 that causes UID 12 to output for display (e.g., at screen 13), the updated user interface 14 that includes information panels 18A and 18B.

Receiving the indication of gesture 2 received at screen 13 may further cause UI module 20 to modify the updated user interface 14 to remove information panel 18A, or in other words, cause computing device 10 to refrain from outputting for display information panel 18A. UI module 20 may modify updated user interface 14 to remove information panel 18A and transmit a display command to UID 12 that causes UID 12 to refrain from outputting for display, at screen 13, information panel 18A (e.g., UID 12 may present information panel 18A with a dynamically reducing size until information panel 18A transitions out of view).

UI module 20 may generate dynamic updates to user interface 14 as gesture module 24 updates the current length of gesture 2. For example, gesture module 24 may determine an increase in the current length of gesture 2. In response to the increase, and update to the current length of gesture 2, UI module 20 may increase the length of information panel 18B and decrease the size of information panel 18A approximately proportionate to the current length of gesture 2. Likewise, gesture module 24 may determine a decrease in the current length of gesture 2. In response to the decrease, and update to the current length of gesture 2, UI module 24 may decrease the length of information panel 18B and increase the size of information panel 18A approximately proportionate to the current length of gesture 2. An update to the current length of gesture 2 may cause UI module 20 to command UID 12 to output for display, the dynamically updated user interface 14. In this way computing device 10 may present information panels 18A and 18B as seesawing information panels. Seesawing information panels may provide a clear indication to the user, performing gesture 2, that information panel 18B is the activated information panel of user interface 14, and not information panel 18A.

Computing device 10 may present information panels at screen 13 in response to receiving gestures at specific locations of screen 13. Computing device 10 may output a first group of graphical elements within a first region of screen 13 and a second group of graphical elements within a second region of screen 13 and detect gesture 1 within the first region and gesture 2 within the second region. The first group of one or more graphical elements may correspond to notification icons and the second group of one or more graphical elements may correspond to status icons. For example, UI module 20 update user interface 14 to include information panel 18A because the start location of gesture 1 corresponds to a location within a region of screen 13 that displays elements 16A. UI module 20 may update user interface 14 to include information panel 18B because the start location of gesture 2 corresponds to a location within a region of screen 13 that displays elements 16B. UI module 20 may include information panel 18A as a notification panel because elements 16A represent notification icons and may include information panel 18B as a settings panel because elements 16B represent system status icons.

Computing device 10 may present information panels at screen 13 in response to receiving at least one of the first and second gestures initiated at an edge of an active region of screen 13. In other words, the first gesture comprises a start location that is at an edge of an active region of screen 13 and/or the second gesture comprises a start location that is at the edge of the active region of screen 13. For example, screen 13 may include an active region for detecting user input. Screen 13 may also include a physical region, outside the active region that cannot detect user input (e.g., a physical border around the active region made of a material, such as plastic or glass, which provides structural integrity to screen 13 but cannot detect a user input). The start location of gesture 1 may correspond to a location at a far edge of the active region of screen 13. And based on the start location of gesture 1 corresponding to the far edge of the active region of screen 13, UI module 20 may update user interface 14 to include information panel 18A. The start location of gesture 2 may correspond to a location at a far edge of the active region of screen 13. And based on the start location of gesture 2 corresponding to the far edge of the active region of screen 13, UI module 20 may update user interface 14 to include information panel 18B.

The first information panel may correspond to one of a notification panel and a settings panel. The second information panel may correspond to one of a notification panel and a settings panel different from the first information panel. For example, computing device 10 may present seesawing information panels in any order determined by the user. Although the examples described above indicate computing device 10 receives gesture 1 before gesture 2 and presents information panel 18A (the notification information panel) before presenting information panel 18B (the settings information panel), a user may likewise command computing device 10 to present information panels 18A and 18B in an opposite sequence by first providing gesture 2 and then providing gesture 1. In this way, computing device 10 may receive gesture 2 prior to receiving gesture 1 and may present information panel 18B at screen 13 before presenting information panel 18A at screen 13.

After computing device 10 outputs for display a subsequent information panel, the user may interact with the content contained within the subsequent information panel by providing a user input at a location at screen 13 that presents the content. The content of the second information panel may include a plurality of configuration options. Each of the plurality of configuration options may correspond to a user configurable feature of the computing device. Computing device 10 may receive an indication of a selection of at least one of the plurality of configuration options. Responsive to receiving the indication of the selection, computing device 10 may modify the user configurable feature of the computing device corresponding to the selected configuration option.

For example, as illustrated in FIG. 1, information panel 18B includes a plurality of configuration options for modifying system settings. Each of the plurality of configuration options may corresponds to a user configurable feature of the computing device such as adjusting the brightness of screen 13, enabling/disabling notifications, enabling/disabling a Wi-Fi radio, etc. After UI module 20 causes UID 12 to present information panel 18B at screen 13, gesture module 24 may receive an indication of a user input received at a location of screen 13 and determine a location of the user input. In response to receiving the indication, UI module 20 may determine the location of the user input corresponds to a selected configuration option included within information panel 18B. UI module 20 may communicate over communication channels 50 with system settings module 58 and may send information about the selected configuration option to system settings module 58.

Responsive to receiving the information from UI module 20, system settings module 58 may command operating system 54 to modify the user configurable feature of computing device 10 corresponding to the selected configuration option. For example, the user may select a configuration option to adjust screen brightness. Upon command from system settings module 58, operating system 54 may cause UID 12 to modify the brightness of screen 13. To preserve the brightness adjustment, system settings module 58 may store the updated brightness setting as system settings data within system settings data store 60.

After presenting information panels 18A and 18B at screen 13, computing device 10 may receive a command from the user to remove the information panels from view. For instance, after displaying information panels 18A and 18B at screen 13, computing device 10 may receive an indication of a third gesture received at screen 13. Responsive to receiving the indication of the third gesture, computing device 10 may refrain from outputting for display information panel 18A and information panel 18B. Or in other words, computing device 10 may modify the updated graphical user interface 14 to remove information panel 18A and to remove the information panel 18B. For example, gesture module 24 may receive an indication of a user input detected at screen 13 of UID 12. Gesture module 24 may determine the user input represents a gesture with a start location coinciding with a location at screen 13 that does not display either information panel 18A or 18B. In response to gesture module 24 determining the start location of the gesture coincides with a location at screen 13 where neither information panel 18A nor 18B is displayed, UI module 20 may update user interface 14 to remove both information panels 18A and 18B.

Computing device 10 may receive a command from the user to remove a single information panel from view by providing a swipe up gesture that starts at a location at screen 13 displaying the bottom edge of the information panel. After displaying information panels 18A and 18B at screen 13 in response to receiving gestures 1 and 2, computing device 10 may receive an indication of a third gesture detected at a location of screen 13. The third gesture may have a length (e.g., a third gesture length). In response to determining the length of the third gesture exceeds a threshold, computing device 10 may modify, based on the location of screen 13 at which the third gesture was detected, the updated graphical user interface 14 to remove one of information panel 18A and information panel 18B. Or in other words, in response to the third gesture, computing device 10 may refrain from outputting for display information panel 18A and information panel 18B.

For example, gesture module 24 may receive an indication of a user input detected at screen 13 of UID 12 and determine the user input represents a gesture with a start location that coincides with a location at screen 13 that displays the bottom edge of information panel 18B. Gesture module 24 may likewise determine the length of the gesture. In response to gesture module 24 determining the start location of the gesture coinciding with the location at screen 13 that displays the bottom edge of information panel 18B, UI module 20 may compare the length of the gesture to a threshold. The threshold may represent the minimum gesture length required to remove a single information panel (e.g., one half inch). Based on the comparison, UI module 20 may determine the length of the gesture exceeds the threshold. In response to determining the length of the gesture exceeds the threshold and the start location of the gesture corresponds to the bottom edge of information panel 18B, UI module 20 may update user interface 14 to remove information panels 18B.

In addition to presenting information panels based on a length of a gesture, computing device 10 may present information panels based on content within an information panel. The first information panel may include content having a content size. The size of the first information panel may be based at least in part on the content size. The second information panel may include content having a content length. The length of the second information panel may be based at least in part on the content length.

For instance, content included within an information panel may have a corresponding content length and content size. Content length may indicate a preferred physical distance on a screen to present the content to a user. Content size may indicate a preferred physical area on a screen to present the content to a user. In response to gesture 1 and gesture 2, UI module 20 may include seesawing information panels 18A and 18B within updated user interface 14 (as described above). However, rather than cause UID 12 to present information panel 18A at screen 13 with a length approximately proportionate to the length of gesture 1, UI module 20 may adjust the size of information panel 18A to correspond to the size of content included in information panel 18A. In response to gesture 1, UI module 20 may include information panel 18A within updated user interface 14 (as described above). Likewise, rather than cause UID 12 to present information panel 18B at screen 13 with a length approximately proportionate to the length of gesture 2, UI module 20 may adjust the length of information panel 18B to correspond to the length of content included in information panel 18B.

FIGS. 3A-3D are conceptual diagrams illustrating example graphical user interfaces for presenting multiple seesawing information panels, in accordance with one or more aspects of the present disclosure. FIGS. 3A-3D are described below within the context of computing device 10 of FIG. 1 and FIG. 2. For example, computing device 10 may present user interfaces 300A-300D as shown in the examples of FIGS. 3A-3D.

Figure 3A:
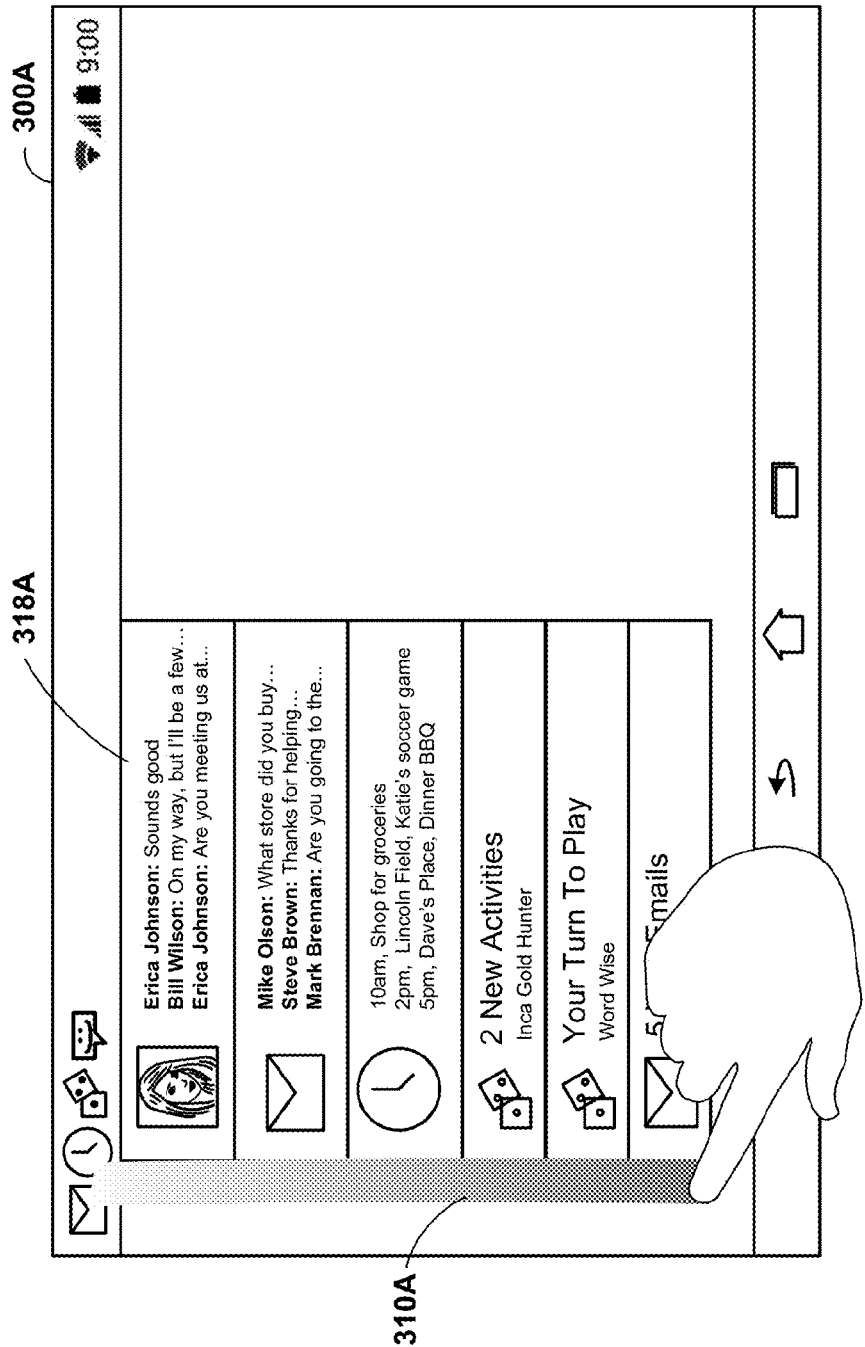
FIGS. 3A-3D are conceptual diagrams illustrating example graphical user interfaces for presenting multiple seesawing information panels, in accordance with one or more aspects of the present disclosure.

FIG. 3A illustrates user interface 300A that includes information panel 318A extending downward as a user of computing device 10 performs gesture 310A on a screen (e.g., screen 13 of computing device 10) presenting user interface 300A. For example, gesture module 24 of computing device 10 may receive an indication of gesture 310A received at screen 13 of computing device 10. Gesture module 24 may determine a current length of gesture 310A and a start location of gesture 310A. In response to gesture 310A, UI module 20 may update user interface 300A to include information panel 318A with a size approximately proportionate to the current length of gesture 310A.

Figure 3B:
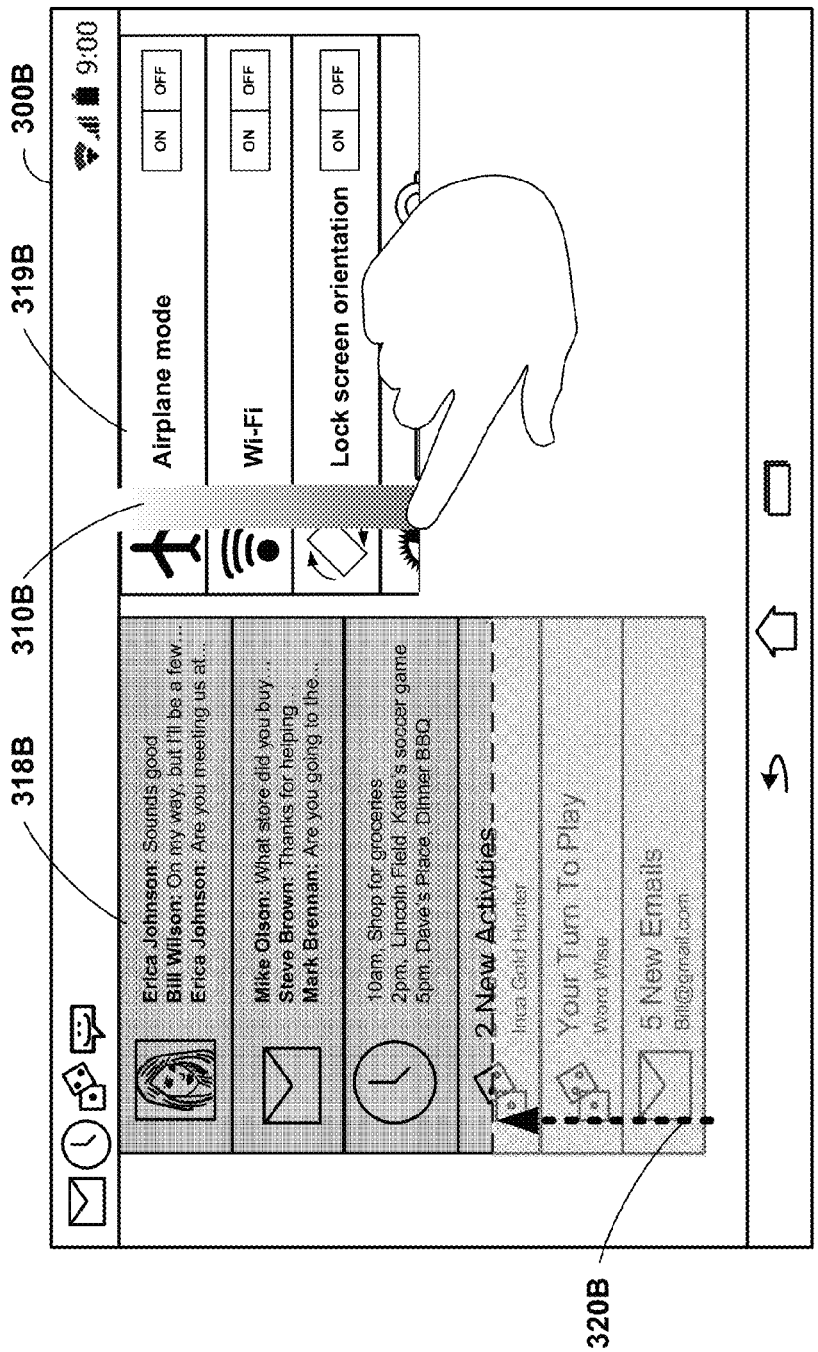

FIG. 3B illustrates user interface 300B as being updated user interface 300B including subsequent information panel 319B extending downward as a user of computing device 10 performs gesture 310B at screen 13. Gesture module 24 of computing device 10 may determine a current length of gesture 310B and a start location of gesture 310B. UI module 20 may update user interface 300B to include information panel 319B with a length approximately proportionate to the length of gesture 310B. UI module 20 may also update user interface 300B to reduce the size of information panel 318B approximately proportionate to the length of gesture 310B (decreasing arrow 320B indicates the reduction in size of information panel 318B).

In addition to the reduction in size to information panel 318B, user interface 300B illustrates that computing device 10 may cause a reduction in brightness of information panel 318B. For example, in updating user interface 300B in response to gesture 310B, UI module 20 of computing device 10 may reduce a brightness of user interface 300B except for a region of user interface 300B that includes information panel 318B.

Figure 3C:
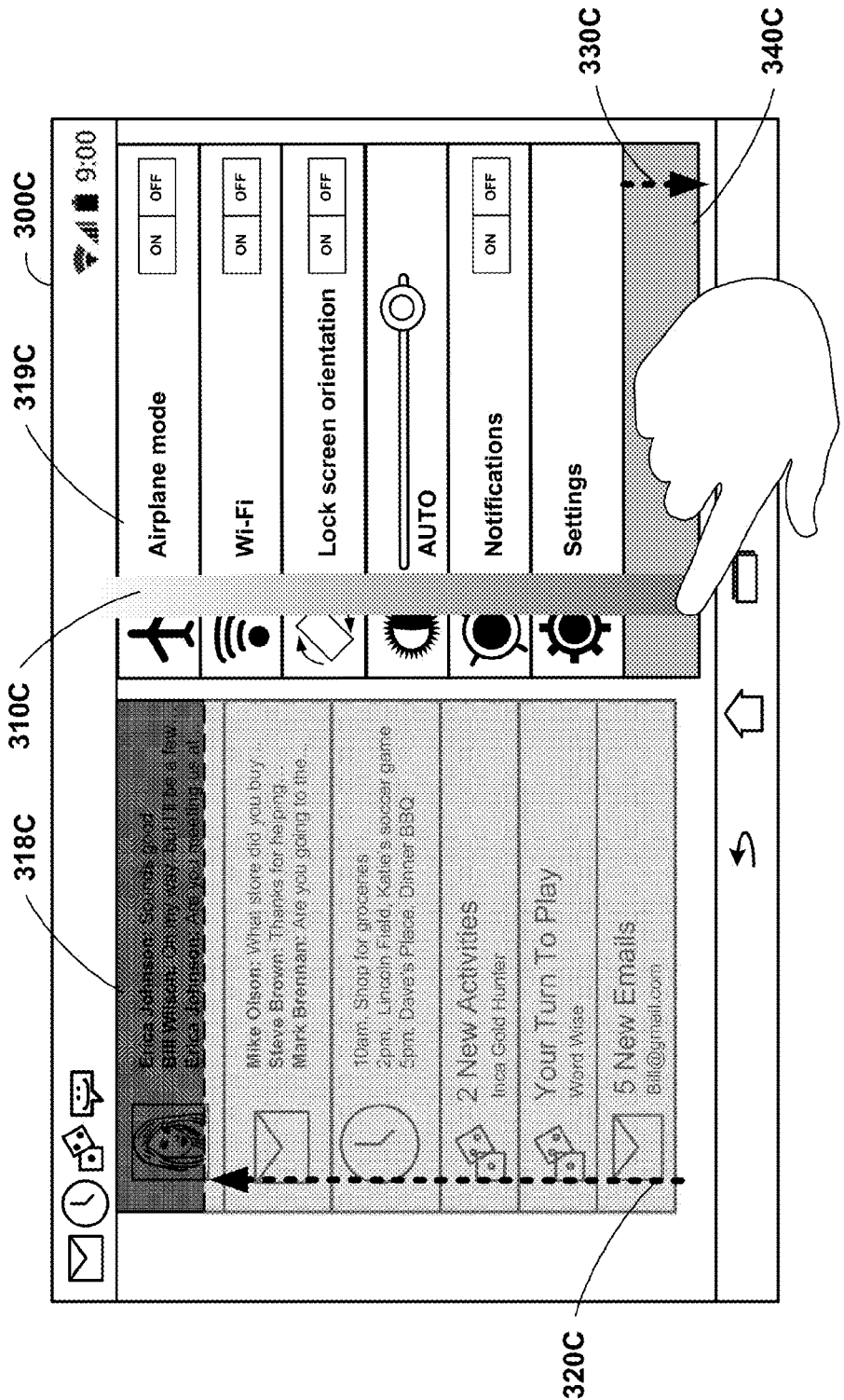

FIG. 3C illustrates user interface 300C as an updated user interface presented by computing device 10. FIG. 3C illustrates information panel 319C extending downwards as the user performs gesture 310C on the screen. Gesture module 24 of computing device 10 may determine a current length of gesture 310C and a start location of gesture 310C.

UI module 20 may update user interface 300C to include information panel 319C with a length approximately proportionate to the length of gesture 310C. UI module 20 may also update user interface 300C to reduce the size of information panel 318C approximately proportionate to the length of gesture 310C (decreasing arrow 320C indicates the reduction in size of information panel 318B). Computing device 10 may reduce the brightness of the regions of user interface 300C based on the length of information panel 319B. For example, as gesture module 24 determines that the current length of gesture 310C increases, UI module 20 may cause the brightness of information panel 318C to darken. A side-by-side comparison FIG. 3B and FIG. 3C illustrates that, as the length of gesture 310C increases beyond the length of gesture 310B, information panel 318C becomes darker than information panel 318B.

In addition to the reduction in size and brightness of information panel 318C, increasing arrow 330C of FIG. 3C illustrates an increase in length of information panel 319C, approximately proportionate to the length of gesture 310C and beyond the length and/or size of the contents contained within information panel 319C. UI module 20 may determine the content size of the contents contained within information panel 319C and allow a user to extend the length of information panel 319C beyond the content size. UI module 20 may determine the current length of gesture 310C exceeds the content size and content length of information panel 319C and modify the region of information panel 319C beyond the content size to appear grey when presented at screen 13. Increasing arrow 330C of FIG. 3C illustrates grey region 340C of information panel 319C to show how the length of gesture 310C and the length of information panel 319C may exceed the length and/or size of the content within information panel 319C.

Figure 3D:
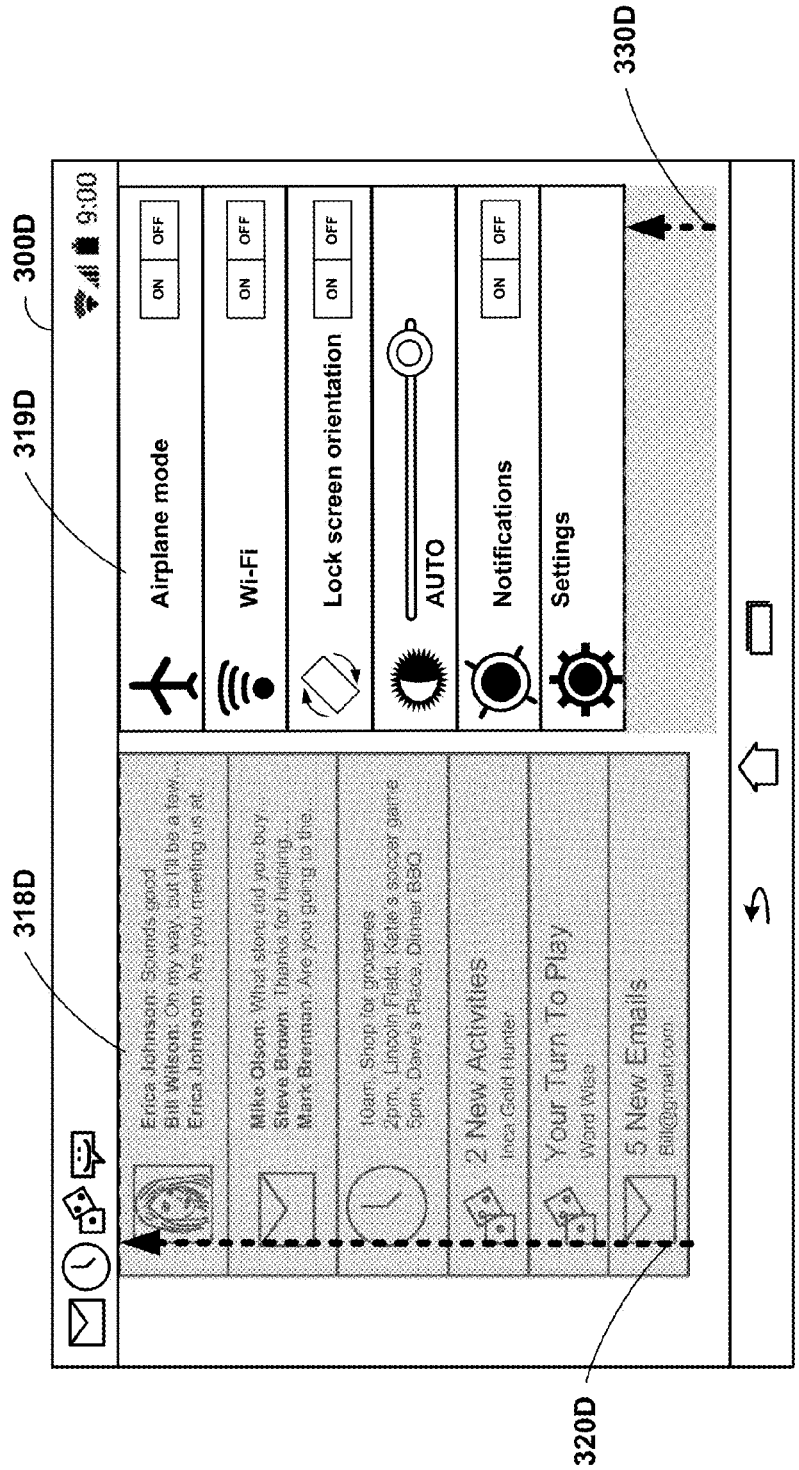

FIG. 3D illustrates user interface 300D as an updated user interface presented by computing device 10. FIG. 3D illustrates information panels 318D and 319D extending upwards (e.g., reducing in size and/or length) automatically without any further gesture from the user detected at screen 13 of computing device 10. For example, gesture module 24 may determine a start location, an end location, and a current (final) length of gesture 310C of FIG. 3. UI module 20 may update user interface 300D to reduce the size of information panel 318D based on the final length of gesture 310C of FIG. 3 determined by gesture module 24. UI module 20 may modify user interface 300D and remove information panel 318D from user interface 300D after determining the final length of gesture 310C of FIG. 3 causes a reduction in size to information panel 318D beyond a maximum reduction in size (as illustrated by decreasing arrow 320D).

FIG. 3D also illustrates one example of a "snap back" feature of computing device 10. Decreasing arrow 330D illustrates a snap back feature of computing device 10 that prevents an information panel from retaining, after the end of a gesture, a length that exceeds the content length of content within the information panel. UI module 20 may determine the length of information panel 319D exceeds the content length of content included in information panel 319D. In response to gesture module 24 detecting an end of gesture 310C, UI module 20 may modify user interface 300D to reduce the length of information panel 319D so the length of information panel 319D does not exceed the content length of the contents included in information panel 319D.

FIGS. 4A-4D are conceptual diagrams illustrating additional example graphical user interfaces for presenting multiple seesawing information panels, in accordance with one or more aspects of the present disclosure. FIGS. 4A-4D are described below within the context of computing device 10 of FIG. 1 and FIG. 2. For example, computing device 10 may present user interfaces 400A-400D as shown in the examples of FIGS. 4A-4D.

Figure 4A:
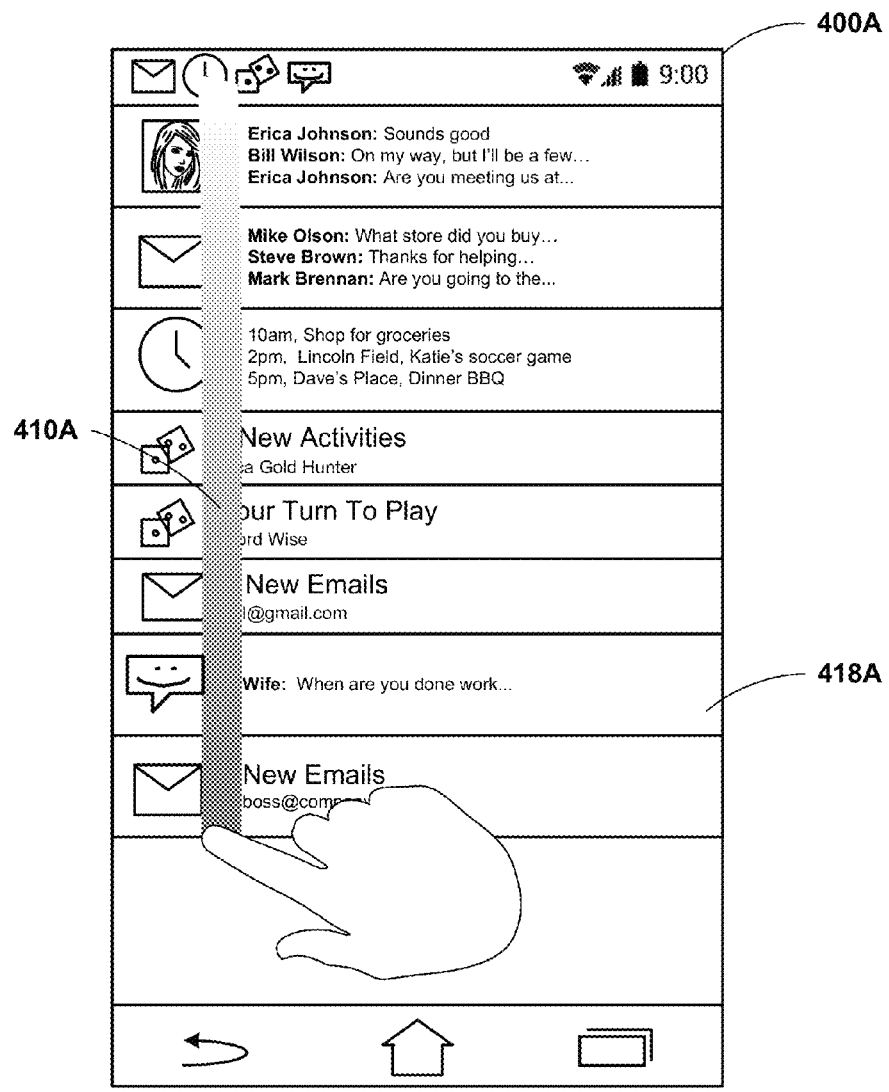
FIGS. 4A-4D are conceptual diagrams illustrating additional example graphical user interfaces for presenting multiple seesawing information panels, in accordance with one or more aspects of the present disclosure.

FIG. 4A illustrates user interface 400A that includes information panel 418A extending downward as a user of computing device 10 performs gesture 410A on a screen (e.g., screen 13 of computing device 10) presenting user interface 400A. For example, gesture module 24 of computing device 10 may receive an indication of gesture 410A received at screen 13 of computing device 10. Gesture module 24 may determine a current length of gesture 410A and a start location of gesture 410A. In response to gesture 410A, UI module 20 may update user interface 400A to include information panel 418A with a size approximately proportionate to the current length of gesture 410A.

Figure 4B:
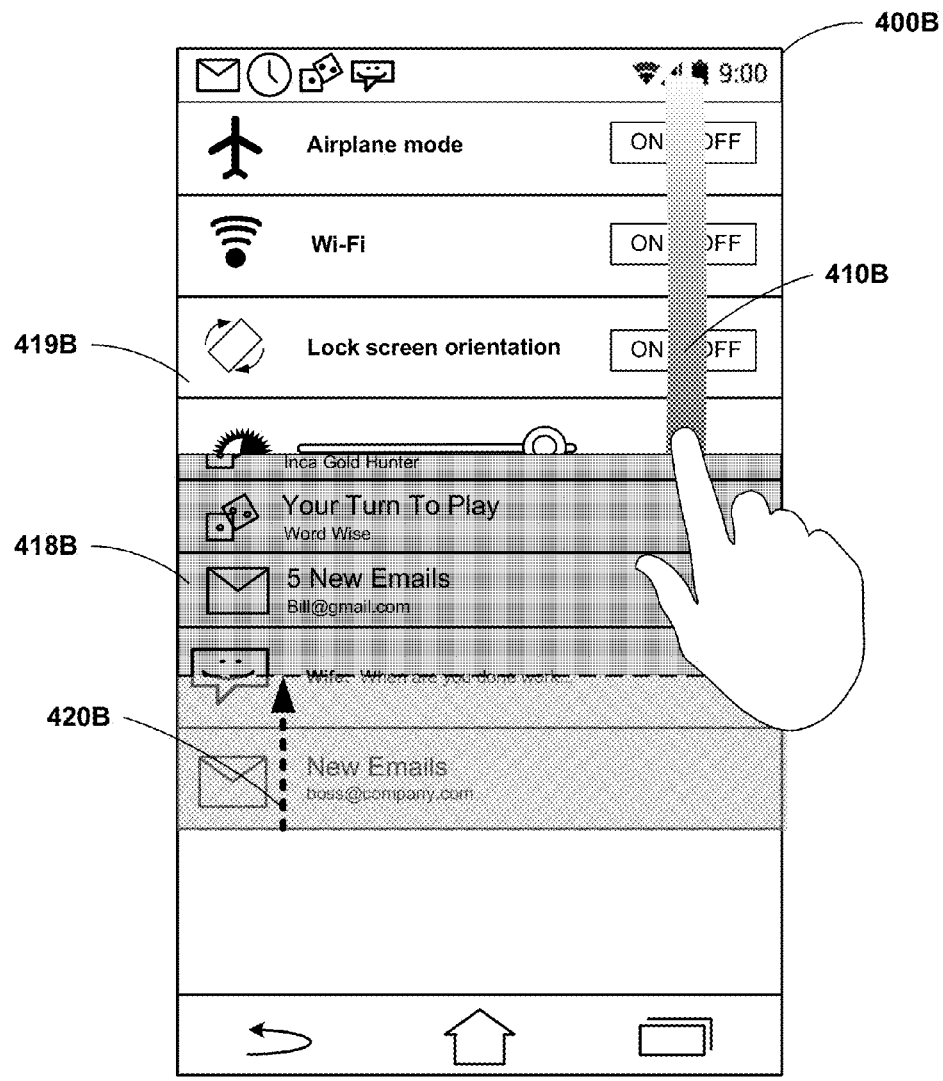

FIG. 4B illustrates user interface 400B as being updated user interface 400B as a user of computing device 10 performs gesture 410B at screen 13. User interface 400B includes information panel 419B extending downward and overlapping information panel 418B as the user performs gesture 410B at screen 13. In other words, rather than present side-by-side information panels, computing device 10 may present overlapping information panels at screen 13 where the second information panel (information panel 419B) overlaps the first information panel (information panel 418B).

For example, gesture module 24 of computing device 10 may determine a start location and a current length of gesture 410B. UI module 20 may update user interface 400B to include information panel 419B overlapping information panel 418B, with a length of information panel 419B approximately proportionate to the length of gesture 410B. UI module 20 may also update user interface 400B to reduce the size of information panel 418B approximately proportionate to the length of gesture 410B (decreasing arrow 420B indicates the reduction in size of information panel 418B) and likewise, decrease the brightness of information panel 418B.

Figure 4C:
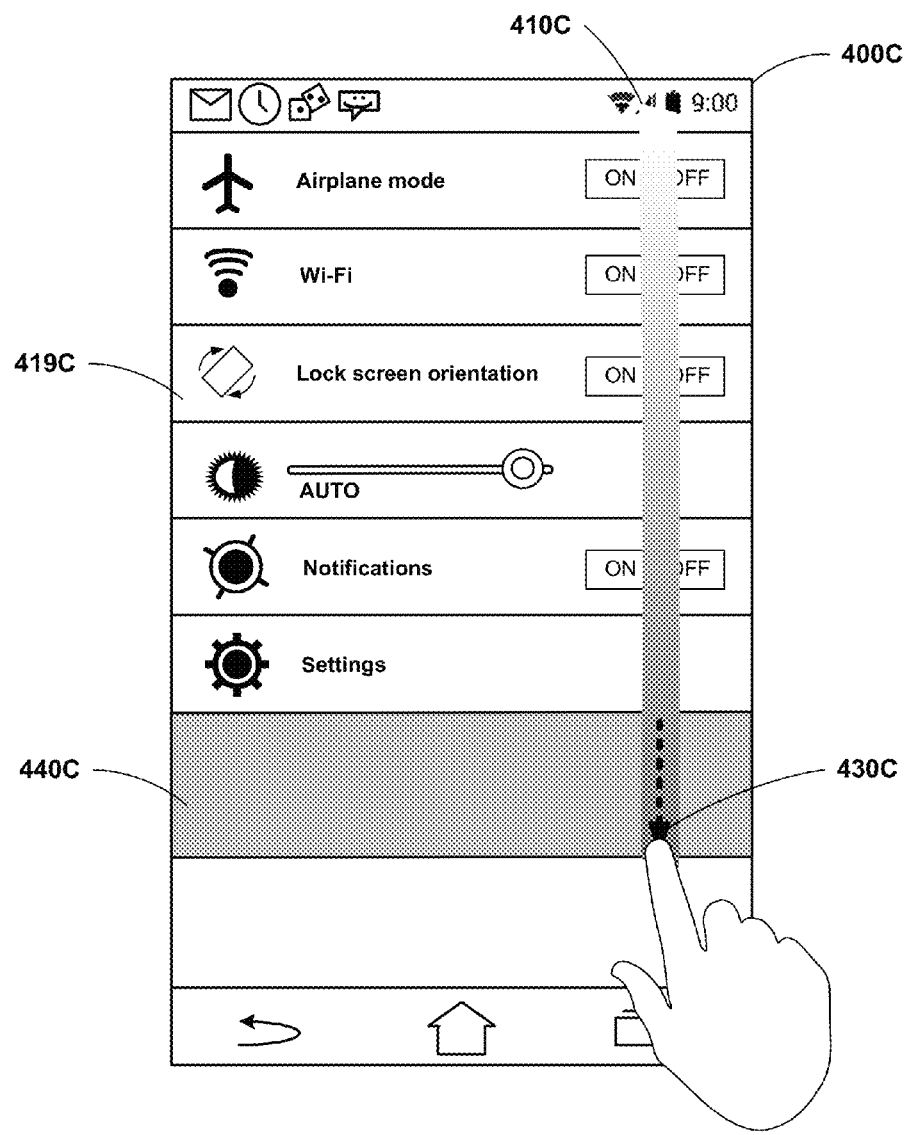

FIG. 4C illustrates user interface 400C as an updated user interface presented by computing device 10. FIG. 4C illustrates information panel 419C extending downwards as the user performs gesture 410C at screen 13. Gesture module 24 of computing device 10 may determine a current length of gesture 410C and a start location of gesture 410C. UI module 20 may update user interface 400C to include information panel 419C with a length approximately proportionate to the length of gesture 410C. UI module 20 cause screen 13 to present updated user interface 400C that includes information panel 419 completely overlapping information panel 418B of FIG. 4B.

In addition to the increase in length of information panel 419C, grey region 440C of information panel 419C along with increasing arrow 430C, illustrate an increase in length of information panel 419C, approximately proportionate to the length of gesture 410C and beyond the length and/or size of the content contained within information panel 419C. UI module 20 may determine the content size of the contents contained within information panel 419C and allow a user to extend the length of information panel 419C beyond the content size. UI module 20 may determine the current length of gesture 410C exceeds the content size and content length of information panel 419C. UI module 20 may modify the region of information panel 419C that extends beyond the content size, to appear grey when presented at screen 13. Increasing arrow 430C and grey region 440C illustrate the length of information panel 419C exceeding the length and/or size of the contents within information panel 419C.

Figure 4D:
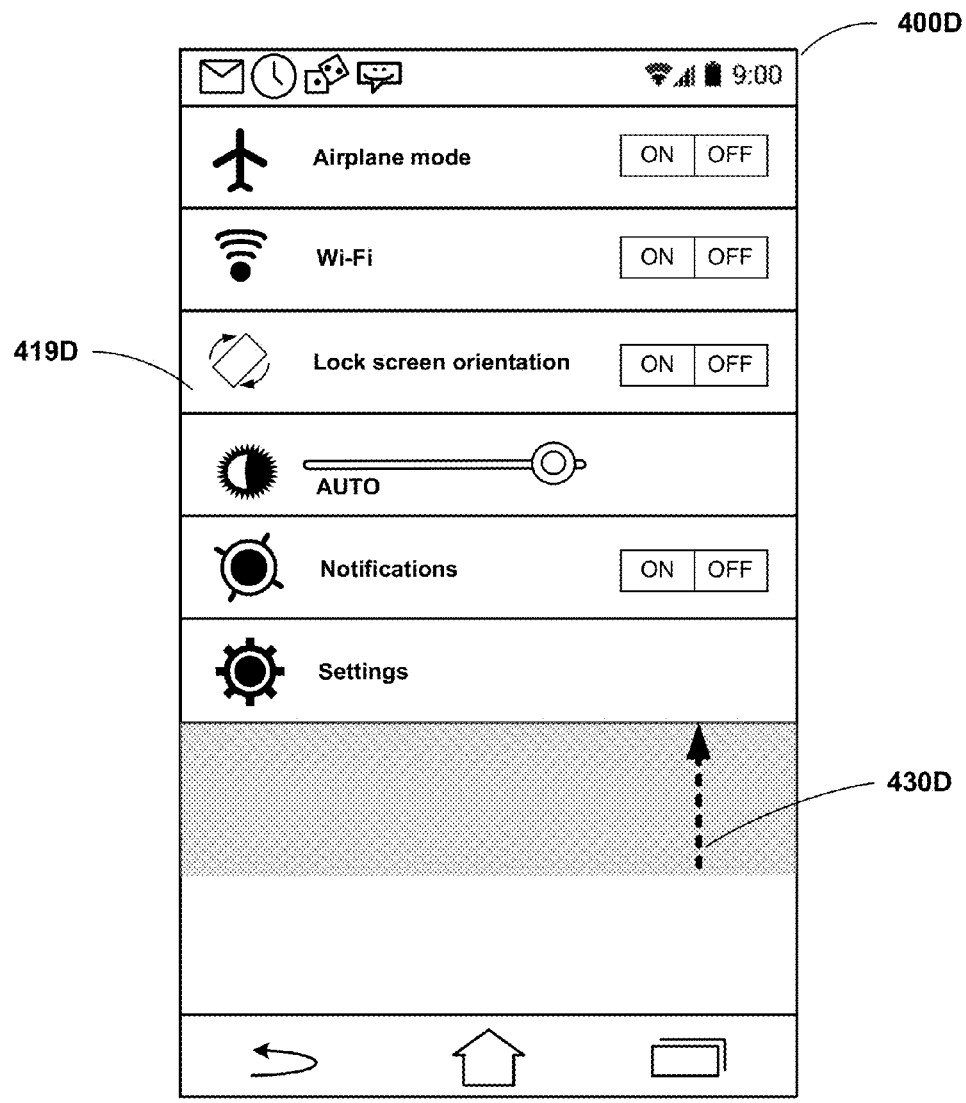

FIG. 4D illustrates updated user interface 400D as an updated user interface to show a "snap back" feature of computing device 10. Decreasing arrow 430D illustrates a snap back feature of computing device 10 that prevents an information panel from retaining, after the end of a gesture, a length that exceeds the content length of content within the information panel. UI module 20 may determine the length of information panel 419D exceeds the content length of content included in information panel 319D. In response to gesture module 24 detecting an end of gesture 410C, UI module 20 may modify user interface 400D to reduce the length of information panel 419D so the length of information panel 419D does not exceed the content length of the contents included in information panel 419D.

In other words, as described above, gesture module 24 may present a second information panel (e.g., information panel 419D) in response to gesture module 24 detecting a start location and a current length of a second gesture (e.g., gesture 410C). As the user continues to input the second gesture, gesture module 24 may update the current length of the second gesture. Gesture module 24 may detect an increase in the length of the second gesture that exceeds the content length of content included in the second information panel (e.g., information panel 419D). Responsive to detecting the increase in the length of the second gesture, UI module 20 may modify updated user interface 400D to increase the length of the second information panel. Gesture module 24 may detect an end of the second gesture. Responsive to detecting the end of the second gesture, UI module 20 may modify, based on the increase, the updated graphical user interface to reduce the size of the second information panel (illustrated by decreasing arrow 430D).

Computing device 10 may present additional seesawing information panels beyond a first and a second subsequent seesawing information panel. For instance, computing device 10 may present third, fourth, etc. information panels as computing device 10 receives third, fourth, etc. user gestures at screen 13. In other words, after computing device 10 presents information panel 419D at screen 13, gesture module 24 may receive an indication of a third gesture received at screen 13. Gesture module 24 may determine a start location and a current length of the third gesture. Responsive to receiving the indication of the third gesture, UI module 20 may modify updated user interface 400D and cause screen 13 to output for display a third information panel at least partially in place of the second information panel (e.g., information panel 419D). The third information panel may have a size approximately corresponding to the current length of the third gesture. In addition, UI module 20 may reduce the brightness of the second information panel (e.g., information panel 419D) approximately proportion to the length of the third gesture.

Figure 5:
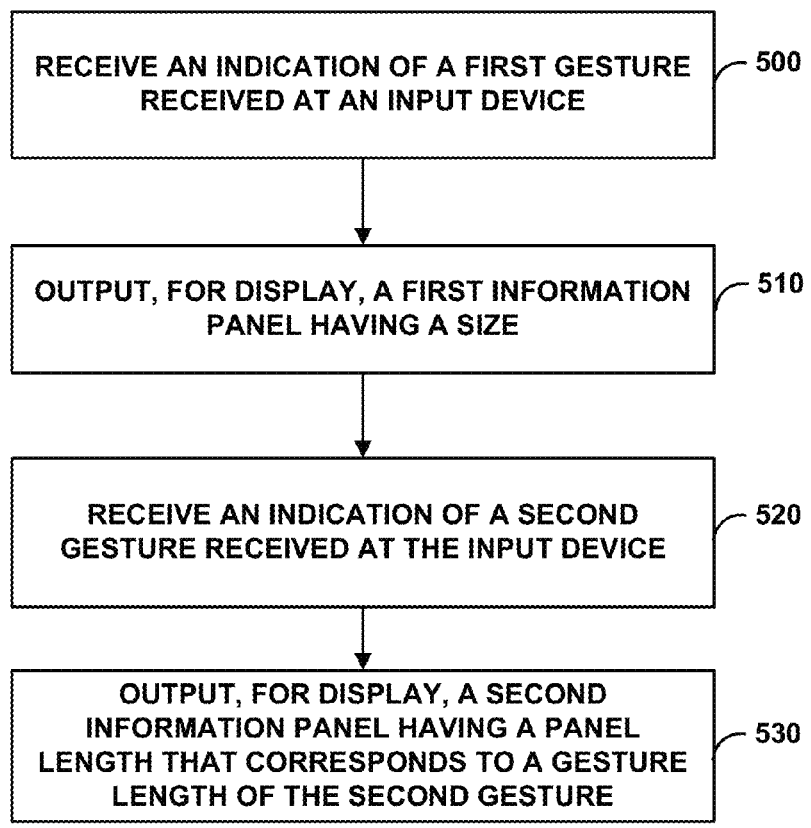
FIG. 5 is a flowchart illustrating an example operation of the computing device, in accordance with one or more aspects of the present disclosure.

FIG. 5 is a flowchart illustrating an example operation of the computing device, in accordance with one or more aspects of the present disclosure. The process of FIG. 5 may be performed by one or more processors of a computing device, such as computing device 10 illustrated in FIG. 1 and FIG. 2. For purposes of illustration, FIG. 5 is described below within the context of computing devices 10 of FIG. 1 and FIG. 2.

Computing device 10 may receive an indication of a first gesture received at an input device (500). For example, gesture module 24 of computing device 10 may detect gesture 1 based on a user touching a presence-sensitive screen of UID 12. Computing device 10 may output, for display, a first information panel having a size (510). For example, UI module 20 may, in response to gesture module 24 detecting gesture 1, cause UID 12 to present user interface 14 including information panel 18A.

Computing device 10 may receive an indication of a second gesture received at the input device (520). For example, gesture module 24 may detect gesture 2 based on the user touching the presence-sensitive screen of UID 12. Computing device 10 may output, for display, a second information panel having a panel length that corresponds to a gesture length of the second gesture (530). For example, in response to gesture module 24 detecting gesture 2, UI module 20 may cause UID 12 to present an updated user interface 14 that includes information panel 18B. Gesture module 24 may determine a gesture length of gesture 2 and UI module 20 may cause UID 12 to present the updated user interface 14 with information panel 18B having a panel length that corresponds to the gesture length of gesture 2. In other words, as the gesture length of gesture 2 increases, UI module 20 may cause UID 12 to present information panel 18B with a panel length that dynamically increases. Conversely, as the gesture length of gesture 2 decreases, UI module 20 may cause UID 12 to present information panel 18B with a panel length that dynamically decreases.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
receiving, by a computing device, an indication of a first gesture received at an input device;
responsive to receiving the indication of the first gesture, outputting, by the computing device, for display, a graphical user interface that includes a first information panel, the first information panel being of a first length;
receiving, by the computing device, an indication of a second gesture detected at the input device; and
responsive to receiving the indication of the second gesture, outputting, by the computing device, for display, an updated graphical user interface that includes the first information panel and a second information panel, such that:
a length of the second information panel is determined based at least in part on a length of the second gesture, and
the first information panel is of a second length, wherein the second length is less than the first length, the second length being based on the length of the second gesture.

2. The method of claim 1, wherein the second length of the first information panel and the length of the second information panel differ proportionally to the length of the second gesture.

3. The method of claim 1, further comprising:
responsive to determining a change in the length of the second gesture:
reducing, by the computing device and based on the change in the length of the second gesture, the length of the second information panel; and
increasing, by the computing device and based on the change in the length of the second gesture, the second length of the first information panel.

4. The method of claim 1, further comprising:
responsive to determining a change in the length of the second gesture:
increasing, by the computing device and based on the change in the length of the second gesture, the length of the second information panel; and
reducing, by the computing device and based on the change in the length of the second gesture, the second length of the first information panel.

5. The method of claim 1, further comprising:
responsive to receiving the indication of the second gesture, modifying, by the computing device, the updated graphical user interface to remove the first information panel.

6. The method of claim 1, wherein the input device comprises a presence-sensitive screen, the method further comprising:
outputting, by the computing device, for display, a first group of one or more graphical elements within a first region of the presence-sensitive screen and a second group of one or more graphical elements within a second region of the presence-sensitive screen, wherein the first gesture is detected within the first region and the second gesture is detected within the second region.

7. The method of claim 1, wherein the second information panel includes a plurality of configuration options, each of the plurality of configuration options corresponding to a user configurable feature of the computing device, the method further comprising:

receiving, by the computing device, an indication of a selection of at least one of the plurality of configuration options; and
responsive to receiving the indication of the selection, modifying, by the computing device, the user configurable feature of the computing device corresponding to the selected configuration option.

8. The method of claim 1, further comprising:
responsive to receiving an indication of a third gesture received at the input device, modifying, by the computing device, the updated graphical user interface to remove the first information panel and to remove the second information panel.

9. The method of claim 1, wherein the input device comprises a presence-sensitive screen, the method further comprising:
receiving, by the computing device, an indication of a third gesture received at a location of the presence-sensitive screen; and
responsive to determining a length of the third gesture exceeds a threshold, modifying, by the computing device and based on the location of the presence-sensitive screen at which the third gesture was received, the updated graphical user interface to remove one of the first information panel and the second information panel.

10. The method of claim 1, wherein the second information panel includes content having a length, the method further comprising:
responsive to detecting an increase in the length of the second gesture that exceeds the length of the content included in the second information panel, increasing, by the computing device and based on the increase in the length of the second gesture, the length of the second information panel; and
responsive to detecting an end of the second gesture, reducing, by the computing device and based on the increase in the length of the second gesture, the length of the second information panel.

11. A computer-readable storage medium comprising instructions that, when executed, configure one or more processors of a computing device to:
receive an indication of a first gesture received at an input device;
responsive to receiving the indication of the first gesture, output, for display, a graphical user interface that includes a first information panel, the first information panel being of a first length;
receive an indication of a second gesture detected at the input device; and
responsive to receiving the indication of the second gesture, output, for display, an updated graphical user interface that includes the first information panel and a second information panel, such that:
a length of the second information panel is determined based at least in part on a length of the second gesture, and
the first information panel is of a second length, wherein the second length is less than the first length, the second length being based on the length of the second gesture.

12. The computer-readable storage medium of claim 11, wherein the second length of the first information panel and the length of the second information panel differ proportionally to the length of the second gesture.

13. The computer-readable storage medium of claim 11, further comprising instructions that, when executed, configure the one or more processors of the computing device to:
  responsive to determining a change in the length of the second gesture:
    reduce, based on the change in the length of the second gesture, the length of the second information panel; and
    increase, based on the change in the length of the second gesture, the second length of the first information panel.

14. The computer-readable storage medium of claim 11, further comprising instructions that, when executed, configure the one or more processors of the computing device to:
  responsive to receiving the indication of the second gesture, modify, the updated graphical user interface to remove the first information panel.

15. The computer-readable storage medium of claim 11, further comprising instructions that, when executed, configure the one or more processors of the computing device to:
  receive, an indication of a third gesture received at a location of the input device; and
  responsive to determining a length of the third gesture exceeds a threshold, modify, based on the location of the input device at which the third gesture was received, the updated graphical user interface to remove one of the first information panel and the second information panel.

16. A computing device comprising:
an input device;
one or more processors; and
at least one module operable by the one or more processors to:
  receive an indication of a first gesture received at the input device;
  responsive to receiving the indication of the first gesture, output, for display, a graphical user interface that includes a first information panel, the first information panel being of a first length;
  receive an indication of a second gesture detected at the input device; and
  responsive to receiving the indication of the second gesture, output, for display, an updated graphical user interface that includes the first information panel and a second information panel, such that:
    a length of the second information panel is determined based at least in part on a length of the second gesture, and
    the first information panel is of a second length, wherein the second length is less than the first length, the second length being based on the length of the second gesture.

17. The computing device of claim 16, wherein the second length of the first information panel and the length of the second information panel differ proportionally to the length of the second gesture.

18. The computing device of claim 16, wherein the at least one module is further operable by the one or more processors to:
  responsive to determining a change in the length of the second gesture:
    reduce, based on the change in the length of the second gesture, the length of the second information panel; and
    increase, based on the change in the length of the second gesture, the second length of the first information panel.

19. The computing device of claim 16, wherein the at least one module is further operable by the one or more processors to:
  responsive to receiving the indication of the second gesture, modify, the updated graphical user interface to remove the first information panel.

20. The computing device of claim 16, wherein the second information panel includes content having a length and the at least one module is further operable by the one or more processors to:
  responsive to detecting an increase in the length of the second gesture that exceeds the length of the content included in the second information panel, increase, based on the increase, the length of the second information panel; and
  responsive to detecting an end of the second gesture, reduce, based on the increase, the length of the second information panel.

* * * * *